(12) United States Patent
Lesko (10) Patent No.: US 11,532,409 B1
(45) Date of Patent: Dec. 20, 2022

(54) DIFFERENTIAL MODE INSTRUMENTATION CABLE

(71) Applicant: Susan Lesko, Elburn, IL (US)

(72) Inventor: Matthew M. Lesko, Elburn, IL (US)

(*) Notice: Subject to any disclaimer, the term of this patent is extended or adjusted under 35 U.S.C. 154(b) by 294 days.

(21) Appl. No.: 17/025,074

(22) Filed: Sep. 18, 2020

Related U.S. Application Data

(60) Provisional application No. 62/903,294, filed on Sep. 20, 2019.

(51) Int. Cl.
| | |
|---|---|
| *H01B 11/20* | (2006.01) |
| *H01R 9/05* | (2006.01) |
| *H01B 11/18* | (2006.01) |
| *H01R 24/38* | (2011.01) |
| *H01R 107/00* | (2006.01) |
| *H02G 15/02* | (2006.01) |
| *H02G 15/04* | (2006.01) |

(52) U.S. Cl.
CPC ....... *H01B 11/206* (2013.01); *H01B 11/1895* (2013.01); *H01R 9/0506* (2013.01); *H01R 24/38* (2013.01); *H01R 2107/00* (2013.01); *H02G 15/025* (2013.01); *H02G 15/04* (2013.01)

(58) Field of Classification Search
CPC ... H01B 11/206; H01B 11/1895; H01B 11/20; H01R 9/0506; H01R 24/38; H01R 2107/00; H01R 9/05; H01R 107/00; H02G 15/025; H02G 15/04; H02G 15/02
See application file for complete search history.

(56) References Cited

U.S. PATENT DOCUMENTS

6,577,187 B1    6/2003 Lesko

*Primary Examiner* — Robert L Deberadinis
(74) *Attorney, Agent, or Firm* — Malin Haley DiMaggio & Bowen, P.A.

(57) ABSTRACT

A differential mode instrumentation cable for improving the signal integrity of audio signals in different environments including use of microphones, speaker cable, audiophile cables and analog audio balanced/differential tie lines comprising a first triaxial cable and a second triaxial cable placed side-by-side and mounted together, said first coaxial cable and said second coaxial cable including a wired connection that includes an active driven shield buffer circuit in each triaxial cable having an inner conductor for voltage in from the positive polarity and minus polarity and the voltage out driven guard shield with series breakout resistor connected to the each triaxial inner shield.

3 Claims, 10 Drawing Sheets

2.5, 3.5 and 6.35 mm  TRS phone plugs 3-pin XLR connectors, female on left and male on right 3-pin XLR + 6.35 mm TRS phone hybrid jack.

DIFFERENTIAL MODE INSTRUMENTATION CABLE

RELATED PATENT APPLICATIONS

Provisional Application Ser. No. 62/903,294 filed Sep. 20, 2019

BACKGROUND OF THE INVENTION

1. Field of the Invention

This invention relates to improved triaxial cable and circuitry for connecting an audio or instrumentation signal output such as a microphone or instrumentation sensor throughout entire signal chain, ultimately to end up as audio or instrumentation signal input, such as a passive/active speaker or transducer for improving audio or instrumentation signal integrity, including microphones, speaker cable, audiophile cable, differential guitar cords and analog audio balanced/differential tie lines in multi-room studios.

The invention is comprised of two triaxial cables, mounted side-by-side, each triaxial cable having an inner conductor connected, at one end, to the positive input of a buffer amplifier, the output of which is connected to a resistor and back to the negative input of the buffer amplifier and buffer amplifier output, through resistor, to the inner shield of each individual triaxial cable.

One triaxial cable inner conductor input end connects to a positive polarity of the microphone or instrumentation sensor output, and the other triaxial cable inner conductor input end connects to the negative polarity output of the microphone or instrumentation sensor. Both triaxial cables' inner conductor outputs, throughout the entire signal chain, end up to connect to speaker or instrumentation transducer amplifier circuitry, transmitting the audio or transducer signals from a microphone or instrumentation sensor, throughout the entire signal chain, to a speaker or instrumentation transducer with reduced noise.

2. Description of Related Art

Improving the signal integrity of audio or instrumentation signals in a variety of different environments including use of microphones, guitar cables, speaker cables, audiophile cables and analog audio balanced/differential tie lines in multi-room studios has long been important signal integrity goals for people that are involved in the production of audio entertainment content.

One source of audio or instrumentation signal distortion and noise has been involved with the audio or instrumentation cables used to transfer audio or instrumentation signals from a source such as a microphone or instrumentation sensor to a desired output. Conventional cable has been used traditionally utilized in various environments which has been plagued with signal integrity issues regarding with degradation regarding the cable's low-pass filter effects due to dielectric absorption and triboelectric (handling noise) effects via inherent capacitance.

Microphone noise reduction has been found also in applications to affect the microphone preamplifier to eliminate audio signal distortion. An Example is found in U.S. Pat. No. 6,577,187 issued to Matthew Lesko inventor in 2003.

Applicant has determined that a solution for greatly enhancing audio signal integrity can be found using two triaxial cables, joined together, eliminating low-pass filter and dielectric absorption effects when the capacitance and conductance are referenced to the guard not to the shield.

SUMMARY OF THE INVENTION

A differential mode instrumentation cable for improving the signal integrity of audio signals in a variety of different environments including the use of connecting microphones and speakers, at both ends of the entire signal chain, comprising a first triaxial cable mounted side-by-side to a second triaxial cable, said first and second triaxial cables each having an inner conductor, a dialectic core, an inner shield, an interlayer, and an outer shield.

The first triaxial cable and the second triaxial cable each have a buffer amplifier circuit at the load end connected to each cable inner conductor. Each triaxial cable is connected to the positive input the buffer amplifier. The buffer amplifier output goes to each triaxial cable's inner shield through a resistor output connected to each triaxial cable inner shield.

Differential signaling of the invention is having the inner conductor of each triaxial cable transmitting the same signal at opposite polarity. Therefore the first triaxial cable is connected to the positive polarity output of the input microphone or instrumentation sensor and the second triaxial cable is connected to the negative polarity contact output from the microphone or instrumentation sensor.

The differential mode instrumentation cable comprising the first triaxial cable and the second triaxial cable, joined together (side-by-side), has a first triaxial inner conductor input end and a second triaxial inner conductor input end for a device such as a microphone or instrumentation sensor and a first triaxial cable inner conductor output end and a second triaxial inner conductor output end for a device such as a passive/active speaker. The differential mode instrumentation cable can be of extended length for use in connecting a microphone or instrumentation sensor as the input and the audio or instrumentation output can be a passive/active speaker. Therefore, the inner conductor of first triaxial cable and the inner conductor of the second triaxial cable together provide the connection between microphone or instrumentation sensor throughout the entire signal chain to the passive/active speaker.

The first triaxial cable and the second triaxial cable shall be provided with appropriate input jacks for the positive and negative microphone or instrumentation sensor output connectors and an appropriate output jacks that would be connectable to an output to the passive/active speaker. The first triaxial cable and the second triaxial cable outer shields will also be connected to the ground.

It is an object of this invention to improve the signal integrity of audio signals in different environments that can include microphones, guitar cables, speaker cables, audiophile cables and analog audio balanced/differential tie lines, utilized in multi-room studios using a differential mode instrumentation cable comprising a first triaxial cable and a second triaxial cable, joined together side-by side, each triaxial cable including its own buffered amplifier output, through a resistor, to its own inner shield, reducing noise for audio or instrumentation signal transfer.

BRIEF DESCRIPTION OF THE DRAWINGS

FIG. 1, bottom picture, shows a solution using a triaxial cable, eliminating low-pass filter and dielectric absorption effects because capacitance and conductance are referenced to the guard not the shield.

FIG. 6 shows a triaxial conductive wire with a center conductor in her braid which is a guard in another braid which is a shield.

FIG. 7 shows a circuit of a driven guard with the voltage in and voltage out. This would be a wired connection for an active driven shield buffer circuit above triaxial center (inner) conductor to the voltage in and the voltage out driven guard with series breakout resistor usually 50 ohms or 75 ohms to triaxial inner (shield) braid guard. This configuration eliminates the cable capacitance and conductance. Corner frequency becomes nonexistent causing the ruler flat frequency response with ultra-wideband with frequency response.

FIG. 8 shows elimination of noise by using differential signaling. Each signal depicted above will be a triaxial cable, two in total, each with an active driven shield buffer circuit.

FIG. 10 shows a 5 Pin XLR and describes each of the pins. Cables mating to microphone preamplifier or instrumentation amplifier will have five pin XLR cable connectors. Opposite cable end of the five pin XLR cable connector will be conventional three pin XLR cable connector.

PREFERRED EMBODIMENTS OF THE INVENTION

Figure 18:
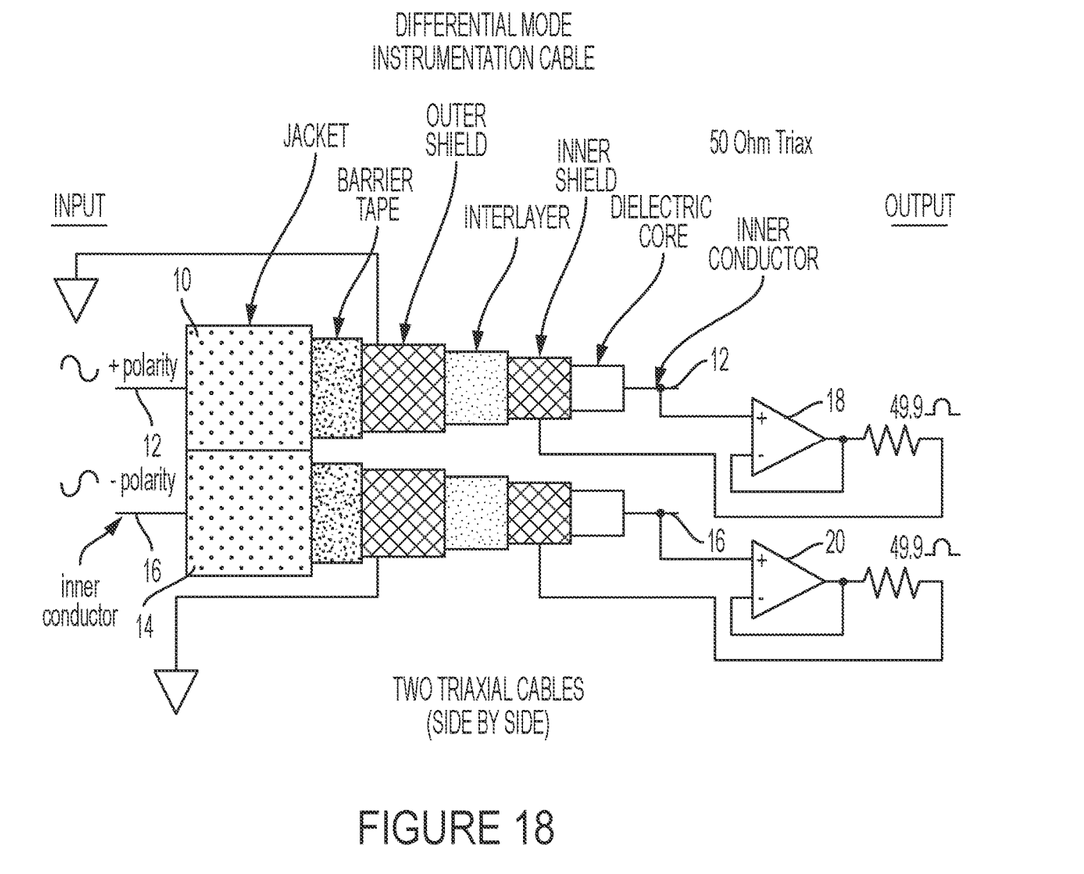
FIG. 18 shows a schematic diagram of the present invention that includes two triaxial cables and the appropriate differential mode circuitry, whose input is sourced by a microphone, or similar device, and whose output is received by a speaker pre-amplifier.

Referring now to FIG. 18, a preferred embodiment of the invention, a differential mode instrumentation cable is shown comprising a first triaxial cable 10 and a second triaxial cable 20, positioned side-by-side. The first and second triaxial cables 10 and 14 each include inner conductors 12 and 16 respectively, a dialectic core, an inner shield, an interlayer insulator, an outer conductive shield, barrier tape and a protective jacket.

The (center) inner conductor in each cable 12 and 16 carries the signal of interest. A second conductor (in each triaxial cable 10 and 14) is arranged as a shield around the inner conductor called the inner shield separated by a first dielectric. A semi-conductive interlayer is situated around the outer surface of the inner shield to reduce noise caused by mechanical motion of the cables' components. A third conductor is typically arranged as an additional shield (called the outer shield) situated around the inner (conductor) shield separated by a second dielectric interlayer as well. With this arrangement, a unity gain amplifier samples the signal on the center conductor for the inner conductor and drives that signal into the inner shield (second conductor or the driven shield). The outer shield (third conductor) serves as a return path for current flowing in the inner (center) conductor. The ground reference for the amplifier and signal is the third conductor.

The invention shown in FIG. 18 can be used to enhance audio signals by connecting the inner conductor at one end as input to a microphone that has two contacts, a positive polarity and a negative s polarity. On the first triaxial cable, the input microphone is connected to the positive polarity. The second triaxial cable inner conductor is connected to the microphone negative polarity. Conventional jacks can be used connect the first and second triaxial cables to a microphone. The output has the inner conductors of the first triaxial cable and second triaxial cable, which can be connected ultimately to a speaker, and the electrical circuitry utilized to produce audio signals' sounds from the speakers. Differential mode instrumentation cable improvements are discussed below using a buffer circuit with each of the cables connected to different polarity signals microphone.

The first and second triaxial cables 10 and 14 each show a buffer amplifier 18 and 20 for an active driven shield buffer circuit and the inner conductors 12 and 16 connected to the voltage coming out to the shield guard (inner shield) from the buffer amplifier 18 and 20 circuit. The voltage out includes a breakout resistor to each triaxial inner braid or inner shield.

The first and second triaxial cables 10 and 14, as shown in FIG. 18, each have an active driven shield buffer circuit.

Figure 19:
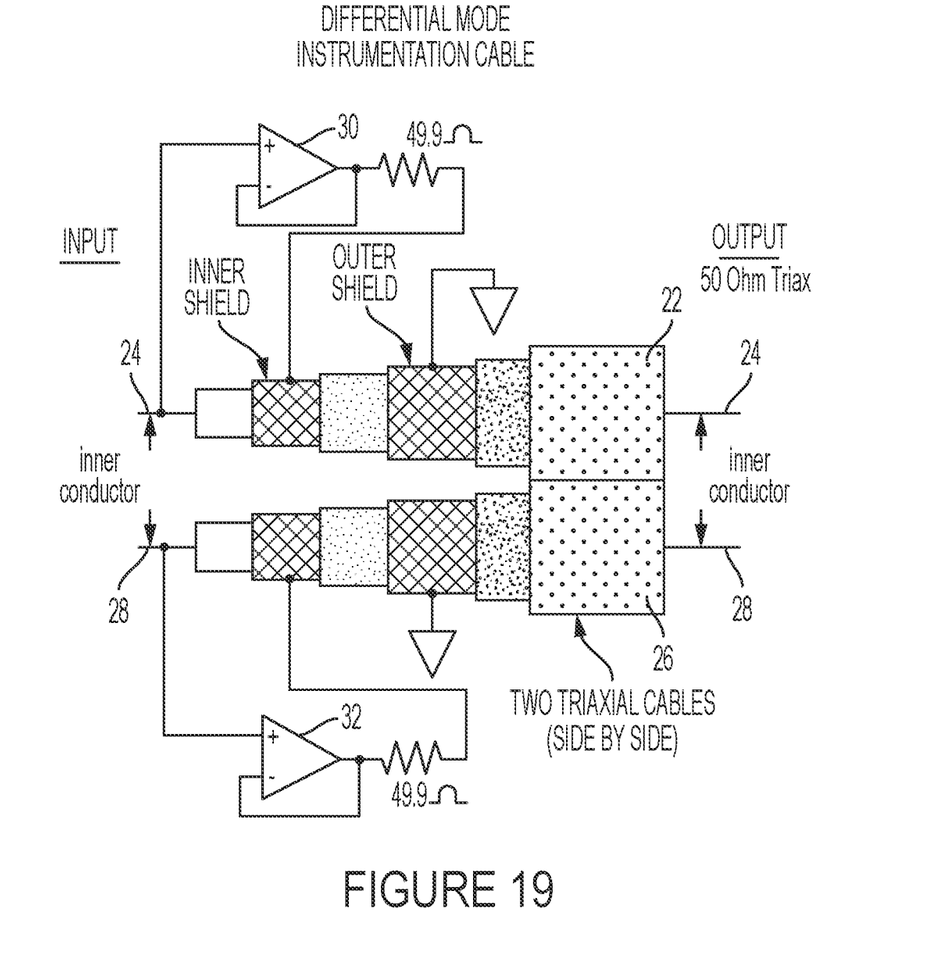
FIG. 19 shows a schematic diagram of the present invention, as the alternate embodiment, that includes two triaxial cables and the appropriate differential mode circuitry, whose input is sourced by an audio microphone pre-amplifier, and the like, and whose output is received by an audio recording console/multi-track audio recording device or similar devices.

FIG. 19 shows an alternate embodiment of the invention; a differential mode instrumentation cable is shown comprising a first triaxial cable 22 and a second triaxial cable 26, positioned side-by-side. The first and second triaxial cables 22 and 26 each include inner conductors 24 and 28 respectively, a dialectic core, and inner shield, and interlayer insulator, and outer conductive shield, barrier tape, and a protective jacket.

The (center) inner conductor 24 and 28, respectively in each cable 22 and 26, carries the signal of interest. A second conductor (in each triaxial cable 22 and 26) is arranged as a shield around the inner conductor called the inner-shield separated by a first dielectric. A semi-conductive interlayer is situated around the outer surface of the inner shield to reduce noise caused by mechanical motion of the cables' components. A third conductor is typically arranged as an additional shield (called the outer shield) situated around the inner (conductor) shield separated by a second dielectric interlayer as well. With this arrangement, a unity gain amplifier samples the signal on the center conductor for the inner conductor and drives that signal into the inner shield (second conductor or the driven shield). The outer shield (third conductor) serves as a return path for current flowing in the inner (center) conductor. The ground reference for the amplifier and signal is the third conductor.

The invention shown in FIG. 19 can be used to enhance audio signals by connecting the inner conductor at one end as input to a microphone that has two contacts, positive polarity and a negative polarity. On the first triaxial cable, the input microphone is connected to the positive polarity. The second triaxial cable inner conductor is connected to the microphone negative polarity. Conventional jacks can be used to connect the first and second triaxial cable to a microphone. The output has the inner conductors of the first and second cable that can be connected ultimately to a speaker and the electrical circuitry utilized to produce audio signal sounds from the speakers. Differential mode instrumentation cable improvements are discussed below using a buffer circuit with each of the cables connected to different polarity circuit signals microphone.

The first and second triaxial cables 22 and 26 each show a buffer amplifier 30 and 32 for an active driven shield buffer circuit and the inner conductors 24 and 28 connected to the voltage coming out to the shield guard (inner shield) from the buffer amplifier 22 and 26 circuit. The voltage out includes a breakout resistor to each triaxial inner braid or inner shield.

The first and second triaxial cables 22 and 26 as shown in FIG. 19 each have an active driven shield buffer circuit.

A second embodiment regarding a speaker cable will provide a new speaker cable design, whereas a conventional lamp cord will be replaced by a differential mode instrumentation cable formed with a pair of triaxial cables, each with active driven shield buffer circuit.

The third embodiment, is with regard to a balanced/differential audiophile cable, with RCA connectors on one end and a ¼" TRS or 3 conductor XLR connector on the other end. The conventional balanced/differential audiophile cable is replaced by a triaxial cable pair, each with an active driven shield buffer circuit.

A fourth embodiment constitutes a new balanced/differential design, for guitar cables, with ¼ inch tip ring sleeve (TRS) plug and three Pin XLR connectors. The unbalanced guitar cable (single ended configuration) will be replaced with a triaxial cable pair, each with an active driven shield buffer circuit, with either a quarter inch tip, ring sleeve (TRS) plug and/or three Pin XLR connector.

A fifth embodiment utilizes analog audio balanced/differential tie lines in multi-room studios that are replaced with the same balanced/differential signaling to a triaxial cable pair, each with an active driven shield buffer circuit.

The present invention provides an unrivaled signal integrity with substantial improvements and benefits that include but are not limited to:
1. Ultra-accurate, neutral, transparent sound, (no color);
2. Increased/Optimized rise time, impulse/transient response and articulation of transmitted audio signal. Signal's musical attack will be most accurately pronounced;
3. No phase shift/group delay, in audio bandwidth of at least 100 K Hz
4. Only cable to meet Super Audio CD (SACD) frequency response specification 50 K Hz (ultra-high bandwidth)
5. 100% of signal's energy is maintained and transferred through the cable (Power Factor=1), with no (0%) signal losses, >200 K Hz bandwidth
6. No (0%) noise/noiseless cable design, to optimize signal-to-noise (S/N) cable characteristic, detail/accuracy of extremely low level audio signals are unrivaled;
7. For stereo paired audio signals, Spatial Image is ultra-stable as a function of frequency, up to a minimum of 200 K Hz, and will provide a three-dimensional aspect to the perceived sound field.
8. Cable runs (length) up to 100 meters (combining FIG. 18 and FIG. 19) will have no (0%) signal degradation.

Figure 1:
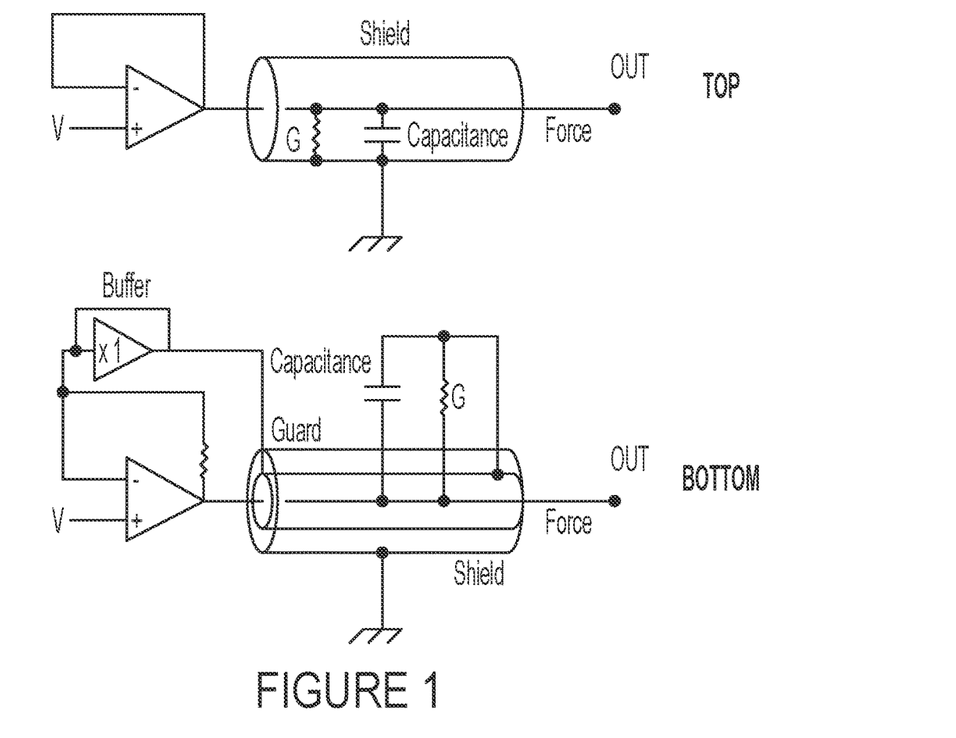
FIG. 1, top picture, shows a conventional cable that has several signal integrity issues that constitutes the prior art picture, forming a low-pass filter and dielectric absorption effects because capacitance and conductance are referenced to the shield.

FIG. 1, top picture, shows a conventional cable that has several signal integrity issues that constitute prior art picture forming a low-pass filter and dielectric absorption affects because capacitance and conductance are reference to the shield.

FIG. 1, bottom picture, shows a solution using a triaxial cable eliminating low-pass filter and by dielectric absorption affects because capacitance and conductance are reference to the guard, not the shield.

Figure 2:
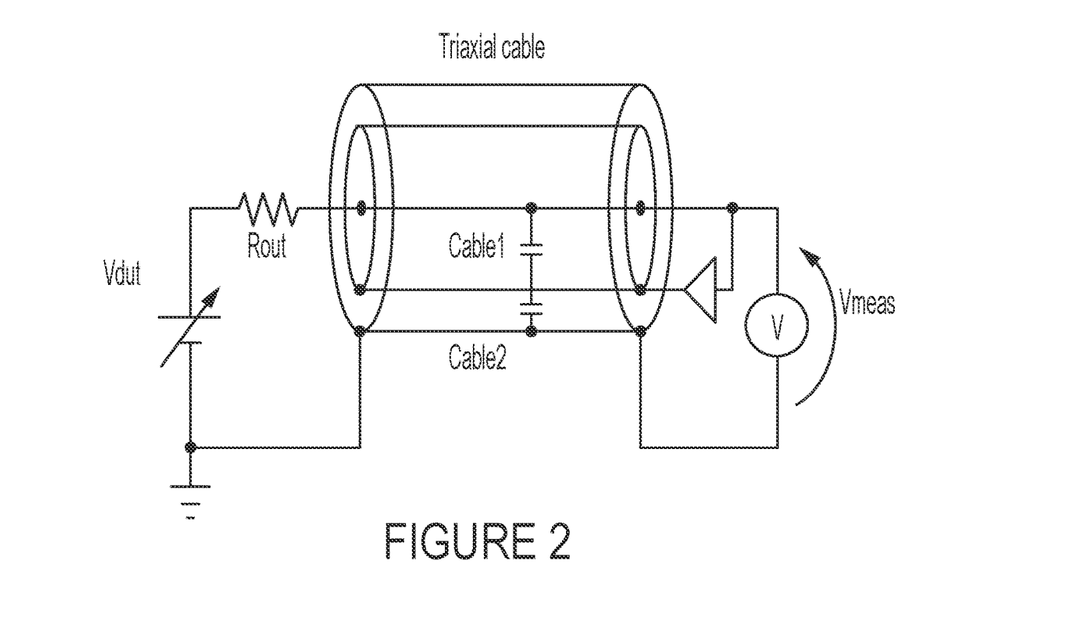
FIG. 2 shows the triaxial concept actual typology prior art, as a single ended/common mode configuration.

FIG. 2 shows the triaxial cable concept actual topology.

Figures 3, 4:
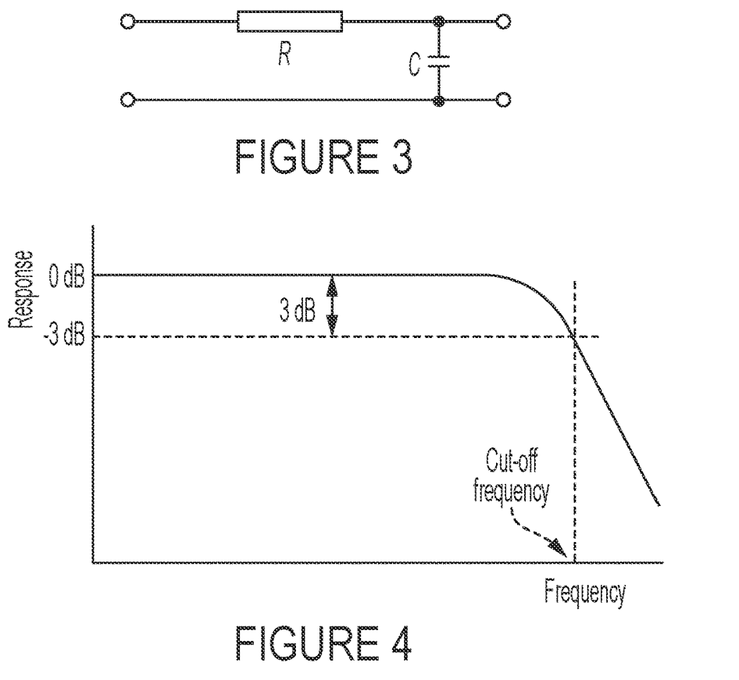
FIG. 3 shows a normal audio, microphone cable and shows cable and treble attenuation, treble cut filter, low-pass principle.
FIG. 4 shows the frequency cut off.

FIG. 3 shows a normal audio, microphone cable. The cable and treble attenuation trouble cut filter, low-pass, shown.

FIG. 4 shows the frequency cut off diagram.

Figure 5:
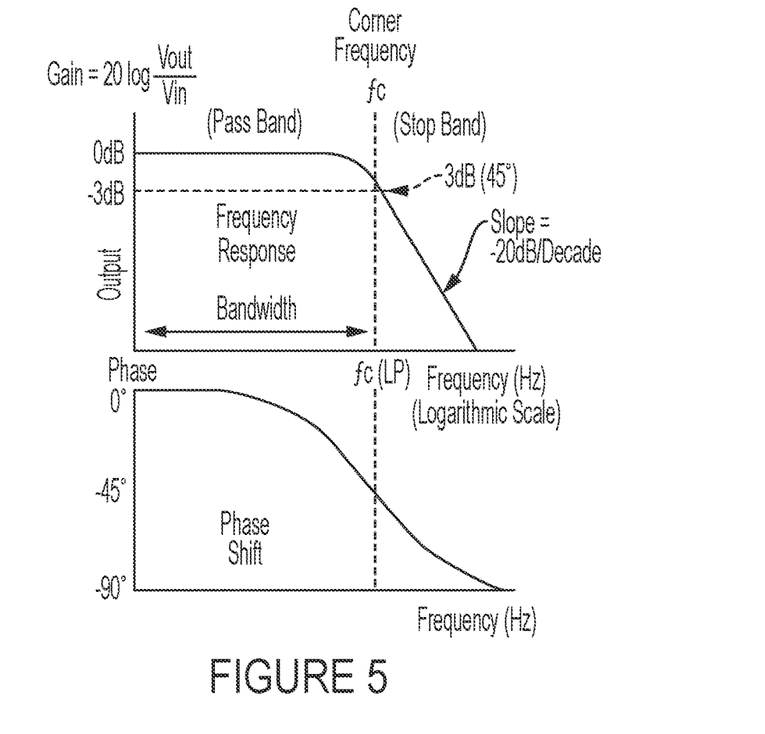
FIG. 5 shows additional details with a phase plot for frequency and output.

FIG. 5 shows additional details with a phase plot for frequency and output.

Figure 6:
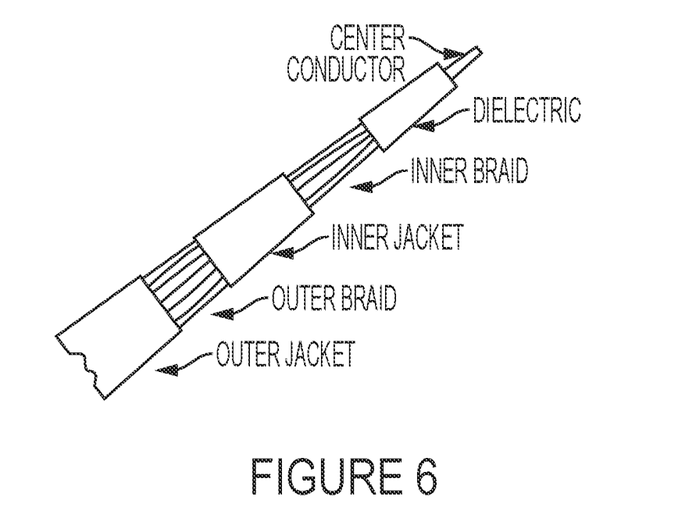
FIG. 6 shows a first embodiment regarding balance/differential signaling using XLR cable connectors.

FIG. 6 shows a triaxial cable portions cutaway show the conductive inner wire, or center conductor, inner braid guard and outer break shield.

Figure 7:
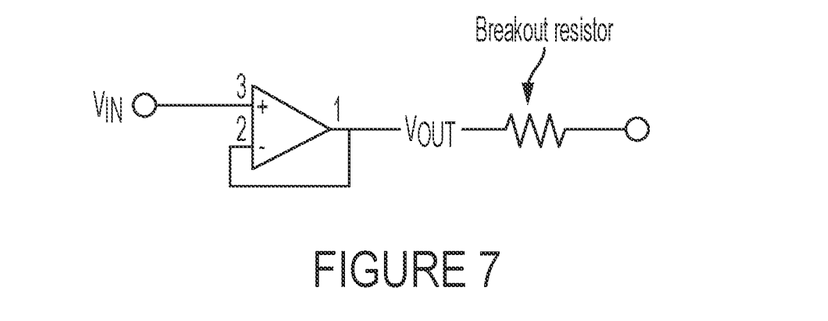

FIG. 7 shows a circuit of a driven guard with the voltage and in voltage out. This is a wired connection for an active driven shield buffer circuit shown in FIG. 18 with the preferred embodiment, and FIG. 19 as the alternate embodiment, above the triaxial cable center or inner conductor of the voltage in voltage out driven guard with a breakout resistor to the triaxial inner braid guard. This configuration eliminates the cable capacitance and conductance. Corner frequency becomes nonexistence causing the ruler flat frequency response with ultra-wide band with frequency response.

Figure 8:
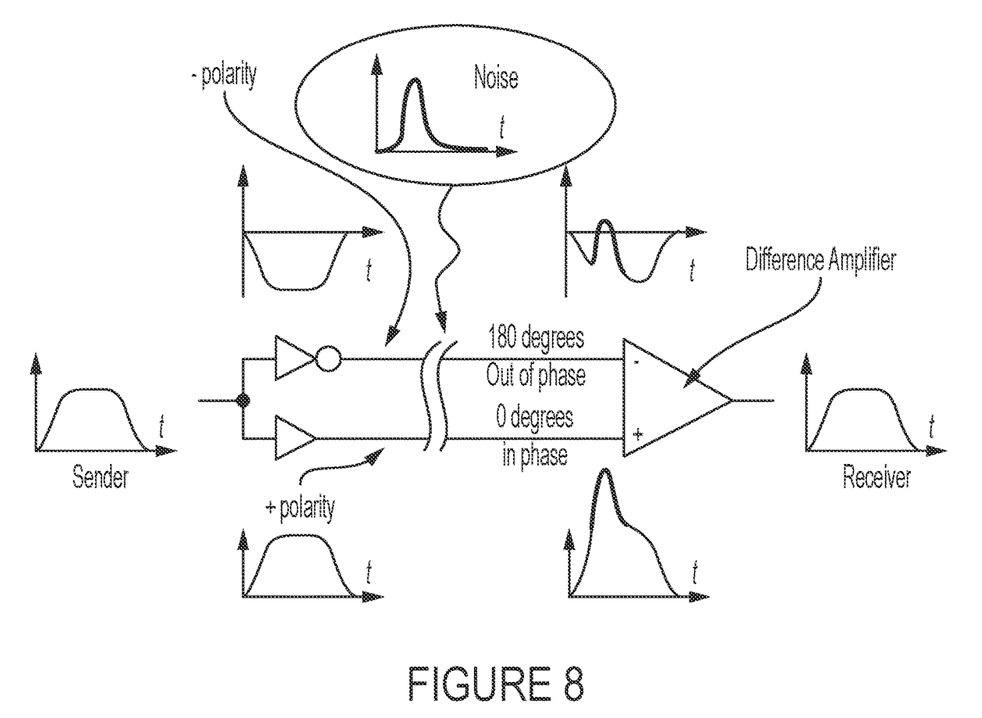

FIG. 8 shows elimination of noise by using differential signaling that is the important part of this invention. Each signal depicted above is the first and second triaxial cables each with an active driven shield buffer circuit as shown in FIG. 18.

Figure 9:
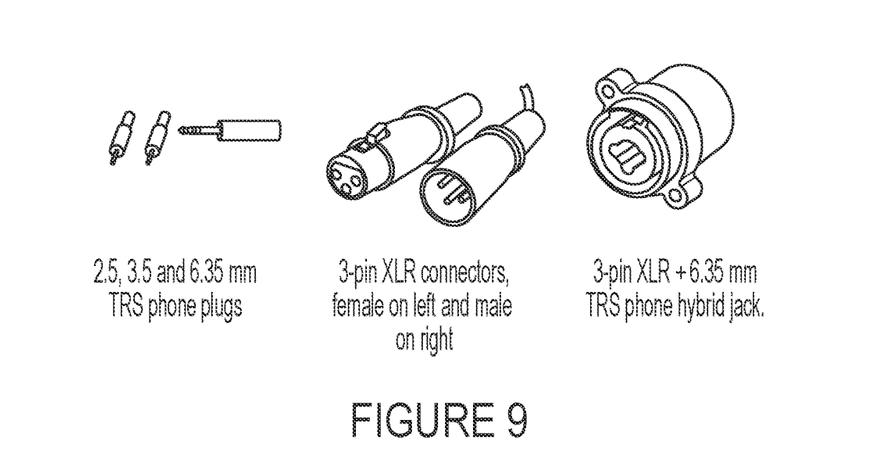
FIG. 9 shows balance/differential connections typically use shielded twisted pair cable and three conductor connectors.

FIG. 9 shows balance/differential connections, typically used, shielded twisted pair cable and three conductor connectors.

Figure 10:
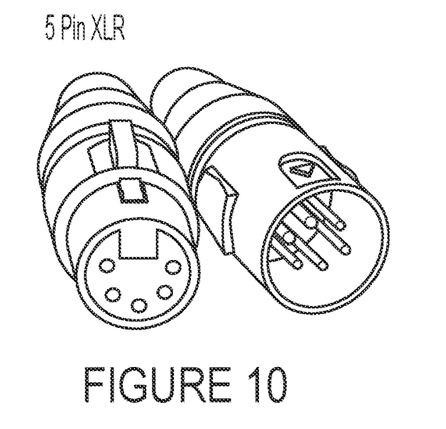

FIG. 10 shows a five pin XLR and describes each of the pins. Cables mating to microphone preamplifier will have five pin XLR cable connectors. Opposite end of the five pin XLR cable connector will be conventional three pin XLR cable connectors.

Figure 11:
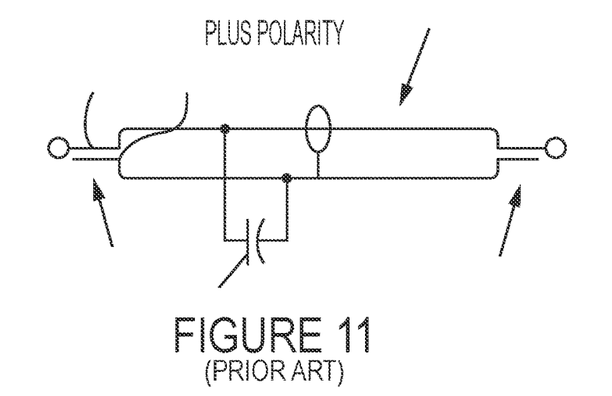
FIG. 11 is a sketch of a typical instrumentation cable, which is single ended configuration. The cable is comprised of lump-sum RLC circuits in series.

FIG. 11 shows a prior art typical instrumentation cable which is single ended configuration. Cable is comprised of lump-sum RLC circuits in series.

Figure 12:
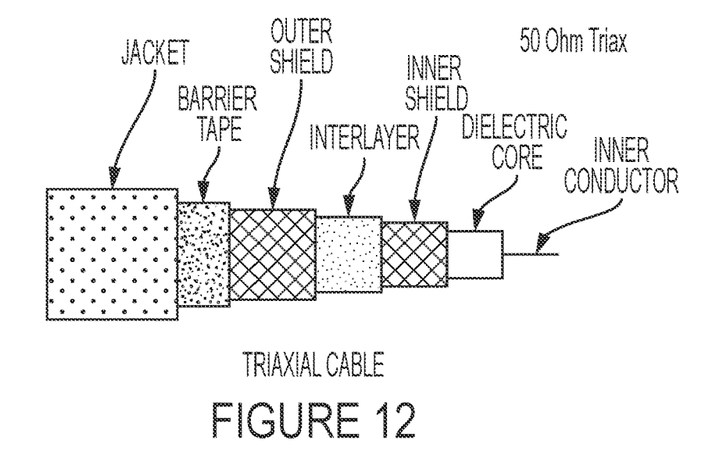
FIG. 12 depicts the component breakdown of a triaxial cable.

FIG. 12 shows a schematic diagram of a triaxial cable broken down to show the individual components. The triaxial cable shown is similar to one shown in FIG. 18.

Figure 13:
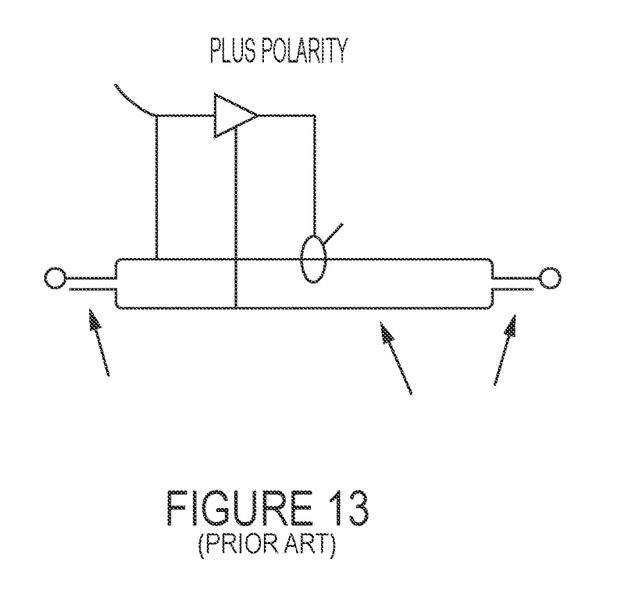
FIG. 13 is a schematic representation of the equivalent circuit of FIG. 11, as a triaxial cable with an active driven shield circuit prior art.

FIG. 13 is a schematic representation of the equivalent circuit of FIG. 11 as a triaxial cable within active driven shield circuit.

Figure 14:
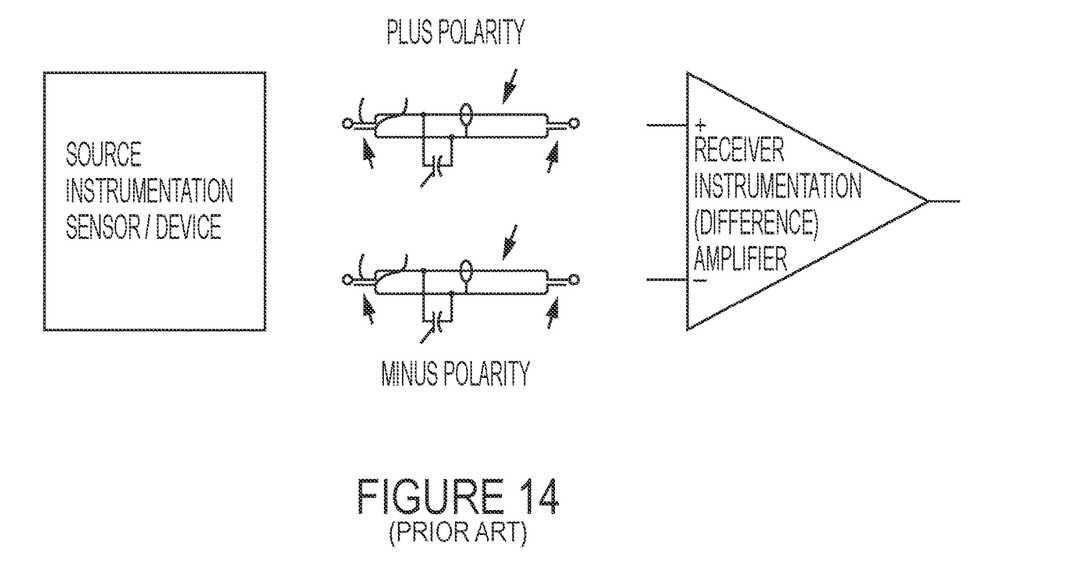
FIG. 14 depicts the signal transference of conventional instrumentation cable, is a differential mode configuration.

FIG. 14 depicts the signal transference of conventional instrumental cable as a differential mode configuration.

Figure 15:
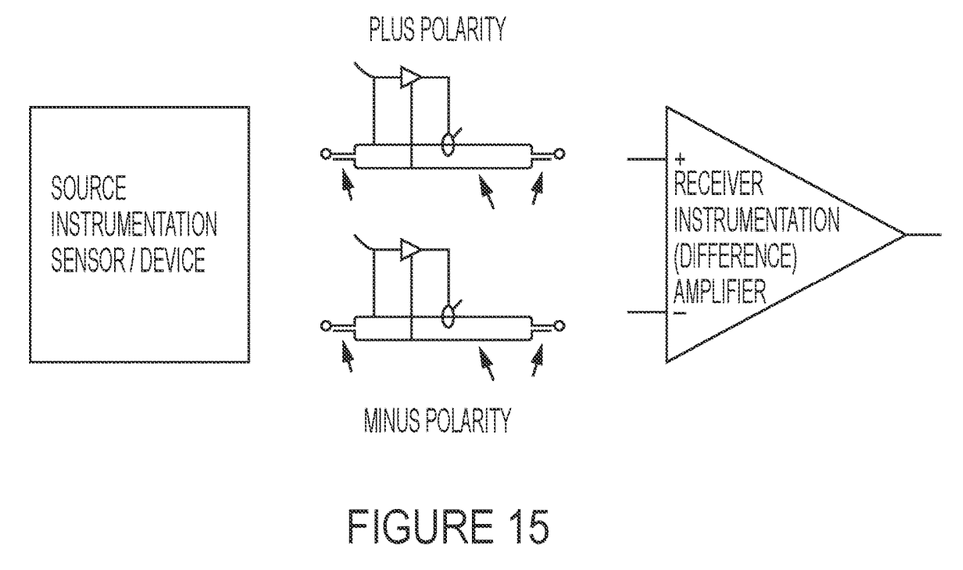
FIG. 15 is a combination of FIG. 13 and FIG. 14, and depicts a unique design as the signal transference of a triaxial pair of cables, each with an active driven shield circuit, as a differential mode configuration, for low signal levels.

FIG. 15 is a combination of FIG. 13 and FIG. 14 depicts a unique design as the signal transference of a triaxial pair each with an active driven shield circuit as a differential mode configuration for low signal levels.

Figure 16:
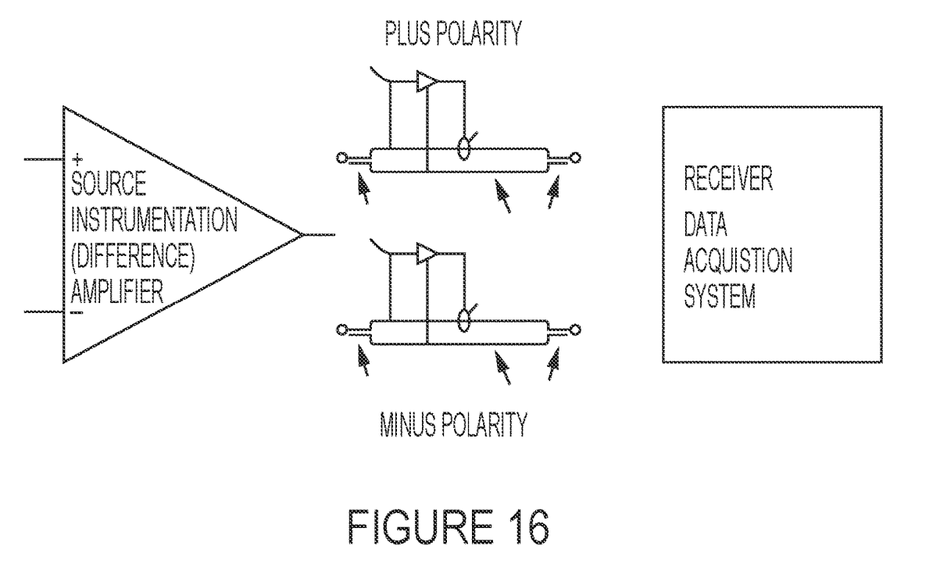
FIG. 16 is a combination of FIG. 13 and FIG. 14, and depicts a unique design as the signal transference of a triaxial pair, each with an active driven shield circuit, as a differential mode configuration, for high signal levels.

FIG. 16 is a combination of FIG. 13 and FIG. 14 and depicts a unique design as the signal transference of the triaxial pair of cables each with an active driven shield circuit as a differential mode configuration for high signal levels.

Figure 17:
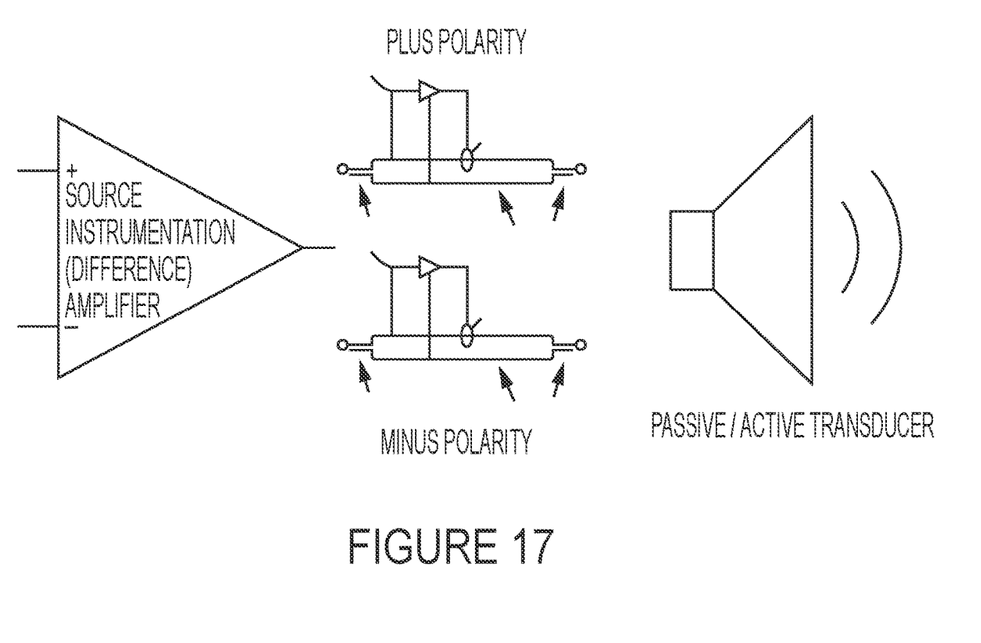
FIG. 17 is a combination of FIG. 13 FIG. 14, and depicts a unique design as the signal transference of a triaxial pair of cables, each with an active driven shield circuit, as a differential mode configuration, for power signal levels.

FIG. 17 is a combination of FIG. 13 FIG. 14 depicts a unique design as the signal transference of a triaxial pair, each with an active driven shield circuit, as a differential mode configuration, for power signal levels.

FIG. 18 shows the differential mode instrumentation cable that constitutes the invention described herein.

FIG. 19 shows the differential mode instrumentation cable that constitutes the invention described herein, as the alternate embodiment.

Active driven shield circuitry can be located and is functional at either end of a custom triaxial cable assembly. The location of the circuit is most preferred at the load side (not the source) of the triaxial cable pair.

Signal transference, with differential mode configuration, as a positive and negative signal polarity. This configuration can differentiate the signal (differential mode) from the noise (common mode interference).

The difference amplifiers at the load and (receiver input circuit) of the differential signal pair. Difference amplifier passes the differential signals through unaltered, except for gain, whereas the common mode signals (noise/interference) are subtracted (removed/rejected) by the difference amplifier.

Accordingly, modifications and variations to which the invention is susceptible may be practiced without departing from the scope and the intent of the appended claims.

The invention claimed is:

1. A differential mode instrumentation cable for improving the signal integrity of audio or instrumentation signals, including the use of microphones or instrumentation sensors and other audio/instrumentation transducers comprising:

first triaxial cable and a second triaxial cable positioned side-by-side, the first triaxial cable and said second triaxial cable each having an inner conductor and each having a first end and a second end;

said first triaxial cable inner conductor and said second triaxial cable inner conductor each having an inner shield surrounding conductor having a first end and a second end; separated by dielectric core first dielectric therefrom;

said first triaxial cable and said second triaxial cable each having a third conductor, each having a first end and a second end, situated external to said second shield conductor, separated by a second dielectric therefrom;

said first triaxial cable and said second try cable having overall insulating layer;

said first triaxial cable and said second each first inner connector having at least a signal terminal and a shield terminal with said first end of said first inner conductor connected to said signal terminal, and with said first end of said third conductor connected to said shield terminal;

said first triaxial cable and said second track cable each having a second connector having at least a signal terminal and a shield terminal with said second end of said first conductor connected to said signal terminal and with said second end of said third conductor connected to said shield terminal; and said first triaxial cable and said second try cable each having an electronic amplifier whose input is connected to said first inner conductor and whose output is connected to said second shield conductor, said electronic amplifier having unity gain that neutralizes the interelectrode capacitance between said first inner conductor and said third conductor of first and second triaxial cables forming said instrumentation cable.

2. A method of improving the signal integrity of audio signals from a source such as a microphone or instrumentation sensor to a desired output, neutralizing interelectrode capacitance and elimination of dialectic absorption comprising the steps of:

a) providing a differential mode instrumentation cable, with a positive and negative polarity pair) that includes a first triaxial cable and a second triaxial cable positioned next to said first triaxial cable;

b) providing said first triaxial cable and said second triaxial cable, each having an inner conductor, a second shield conductor disposed around said inner conductor, separated by a first dielectric therefrom, and third conductor situated external to said second shield conductor, separated by a second dielectric therefrom, and an overall insulating layer; and c) providing a unity gain electronic amplifier, for each polarity, for said first triaxial cable inner conductor and said second triaxial cable inner conductor, said unity gain electronic amplifier input being connected to said first triaxial cable inner conductor and whose output is connected to said second shield conductor, said electronic amplifier is unity gain, said second capacitance being the characteristic said inter electrode capacitance of said instrumentation cable.

3. A differential mode instrumentation cable to connect the output of a microphone or instrumentation sensor, throughout the entire signal chain, to the input of an audio speaker or instrumentation transducer while neutralizing the interelectrode capacitance and elimination of dialectic absorption comprising:

a first triaxial cable, having an inner conductor, surrounded by an inner shield in a dialectic core, that includes a buffer (unity gain) amplifier, connected to the inner conductor and the inner shield; and a second triaxial cable, having an inner conductor, surrounded by an inner shield and a dialectic core, that includes a buffer (unity gain) amplifier, connected to the inner conductor in the inner shield;

whereby the cable capacitance reduction circuits use a unity gain amplifier drive the first and second triaxial cable inner shields.

* * * * *